United States Patent [19]

Hohenstein et al.

[11] Patent Number: 5,675,726
[45] Date of Patent: Oct. 7, 1997

[54] FLEXIBLE PARITY GENERATION CIRCUIT

[75] Inventors: Gerald Lee Hohenstein, Boulder; Michael E. Nielson, Broomfield; Tin S. Tang, Boulder; Richard D. Carmichael, Longmont; William A. Brant, Boulder, all of Colo.

[73] Assignee: EMC Corporation, Hopkinton, Mass.

[21] Appl. No.: 555,331

[22] Filed: Nov. 8, 1995

Related U.S. Application Data

[63] Continuation of Ser. No. 402,963, Mar. 10, 1995, Pat. No. 5,469,566, which is a continuation of Ser. No. 851,428, Mar. 12, 1992, abandoned.

[51] Int. Cl.[6] .................................................. G06F 11/00
[52] U.S. Cl. ...................... 395/182.04; 395/182.07; 395/183.08; 395/441; 371/40.4; 371/492
[58] Field of Search .......................... 395/182.04, 182.07, 395/183.08, 441, 182.05, 405, 439, 454, 484, 494, 495; 371/40.4, 49.2, 51.1

[56] References Cited

U.S. PATENT DOCUMENTS

| | | | |
|---|---|---|---|
| 3,893,178 | 7/1975 | Sordello | 360/73 |
| 4,092,732 | 5/1978 | Ouchi | 364/900 |
| 4,201,976 | 5/1980 | Patel | 371/50 |
| 4,205,324 | 5/1980 | Patel | 371/50 |
| 4,467,421 | 8/1984 | White | 364/200 |
| 4,562,576 | 12/1985 | Ratcliffe | 371/21 |
| 4,667,326 | 5/1987 | Young et al. | 371/40 |
| 4,722,085 | 1/1988 | Flora et al. | 371/38 |

(List continued on next page.)

FOREIGN PATENT DOCUMENTS

| | | | |
|---|---|---|---|
| 9113404 | 9/1991 | WIPO | G06F 11/10 |

OTHER PUBLICATIONS

Patterson, D.A., Gibson, G., and Katz, H.; A Case For Redundant Arrays of Inexpensive Disks (RAID) Jun. 1, 1988).

Lee, E.K.; Software and Performance Issues in the Implementation of a RAID Prototype (May 1990).

Chen, P., Gibson, G., Katz, R.H., Patterson, D.A., and Schulze, M.; Introduction to Redundant Arrays of Inexpensive Disks (RAID) (Dec. 1988).

Chen, P., Gibson, G., Katz, R.H., Patterson, D.A., and Schulze, M.; How Reliable is RAID? (Feb. 1988).

Chen, P., Gibson, G., Katz, R.H., Patterson, D.A., and Schulze, M., et al.; Evolution of the Raid 2 Architecture (Jun. 12, 1990).

Maxium Strategy, Inc., San Jose, CA; Strategy 2 Disk Array Controller Operation Manual (Nov. 2, 1988).

Maximum Strategy, Inc., San Jose CA; Strategy 1 Disk Array Controller Operaton Manual (Date Unknown).

(List continued on next page.)

*Primary Examiner*—Robert W. Beausoliel, Jr.
*Assistant Examiner*—Joseph E. Palys
*Attorney, Agent, or Firm*—William J. Kubida; Holland & Hart LLP

[57] ABSTRACT

A redundant array computer system having a high-speed CPU bus and lower-speed I/O buses, in which parity blocks are generated for a plurality of data blocks from multiple CPU bus logical channels in a randomly-interleaved manner to provide enhanced I/O transfer rates. For example, such a system may have two channels for processing two sets of data. The parity generation technique employs switching means to switch channels on the CPU bus between the first set and the second set, generating parity information that can be transferred independently over two I/O buses. The parity generation technique achieves an effective I/O bus transfer rate more closely matched to the speed of the CPU bus. The invention shares a single XOR gate and related support circuitry between multiple logical channels by providing a configurable electronic memory, thus achieving economies in implementation. For certain system applications, it may be desirable to utilize the RAM as a large, unified FIFO. Thus, the system can be adapted to generate parity information for very large blocks of data in a single channel.

24 Claims, 4 Drawing Sheets

PRIOR ART

U.S. PATENT DOCUMENTS

| | | | |
|---|---|---|---|
| 4,754,397 | 6/1988 | Varaiya et al. | 364/200 |
| 4,761,785 | 8/1988 | Clark et al. | 371/51 |
| 4,768,193 | 8/1988 | Takemae | 371/10 |
| 4,775,978 | 10/1988 | Hartness | 371/38 |
| 4,817,035 | 3/1989 | Timsit | 364/900 |
| 4,849,929 | 7/1989 | Timsit | 364/900 |
| 4,870,643 | 9/1989 | Bultman et al. | 371/11.1 |
| 4,899,342 | 2/1990 | Potter et al. | 371/10.1 |
| 4,914,656 | 4/1990 | Dunphy, Jr. et al. | 371/10.2 |
| 4,975,828 | 12/1990 | Wishneusky et al. | 364/200 |
| 4,989,206 | 1/1991 | Dunphy, Jr. et al. | 359/54 |
| 4,993,030 | 2/1991 | Krakauer et al. | 371/40.1 |
| 5,088,081 | 2/1992 | Farr | 321/10.1 |
| 5,130,992 | 7/1992 | Frey, Jr. et al. | 371/40.1 |
| 5,134,619 | 7/1992 | Hensen et al. | 371/40.1 |
| 5,148,432 | 9/1992 | Gordon et al. | 371/10.1 |
| 5,177,744 | 1/1993 | Cesare et al. | 395/182.04 |
| 5,239,640 | 8/1993 | Froemke et al. | 395/425 |
| 5,258,984 | 11/1993 | Menon et al. | 395/182.05 |
| 5,271,012 | 12/1993 | Blaum et al. | 371/10.1 |
| 5,274,799 | 12/1993 | Brant et al. | 395/575 |
| 5,357,509 | 10/1994 | Ohizumi | 395/182.05 |
| 5,390,187 | 2/1995 | Stallmo | 371/10.1 |
| 5,398,253 | 3/1995 | Gordon | 371/10.1 |
| 5,469,566 | 11/1995 | Hohenstein et al. | 395/182.04 |

OTHER PUBLICATIONS

Gibson, G.A., Performance and Reliability in Redundant Arrays of Inexpensive Disks (Date Unknown).

Chen, P., An Evaluation of Redundant Arrays of Disks Using an Amdahl 5890; (May 1989).

Katz, R.H., Gibson, G.A. and Patterson, D.A.; Disk System Architectures for High Performance Computing (Mar. 1989).

Gray, J., Horst, B., and Walker, M.; Parity Striping and Disc Arrays: Low–Cost Reliable Storage with Accectable Throughput (Jan. 1990).

Schultz, M.E.; Considerations in the Design of Raid Prototype (Aug. 1988).

Clark and Corrigan; IBM Systems Journal, vol. 28, No. 3, 1989.

Hou, et al.; Balancing I/O Response Time and Disk Rebuild Time in RAIDS Disk Array; 1993 IEEE pp. 70–99.

FLEXIBLE PARITY GENERATION CIRCUIT

This is a continuation of application Ser. No. 08/402,963, filed Mar. 10, 1995, now U.S. Pat. No. 5,469,566, which is a continuation of application Ser. No. 07/851,428, filed Mar. 12, 1992 (now abandoned).

BACKGROUND OF THE INVENTION

1. Field of the Invention

The invention relates generally to computer data storage systems, and more particularly to a flexible parity generation circuit for use with a redundant array of data storage units.

2. Description of the Prior Art

State-of-the-art computing systems generally employ CPUs and solid-state memories which operate at relatively high speeds compared with the typical I/O access times of data storage units, such as magnetic or optical disk drives. The performance capabilities of these CPUs and memories is not maximally utilized unless the speed of I/O data transfer operations is increased correspondingly. One technique of enhancing I/O data transfer speed involves the use of a plurality of data storage units, such that a plurality of these units may be accessed at a given moment.

Although the use of multiple data storage units increases the overall speed of I/O data transfer operations, this approach has one disadvantage. As the number of storage units increases, the mean-time-between-failure of the array of units decreases proportionately. Assuming a constant failure rate, such that time to failure is exponentially distributed, and further assuming that failures are independent, the mean time before failure of an array of storage units is equal to the mean time before failure of a single unit divided by the number of units in the array.

Utilization of large data storage unit arrays necessitates the employment of data backup or redundancy techniques to recover data if a storage unit fails. To overcome the reliability problem, storage unit configurations have been developed which use additional storage space to store redundancy information. In this manner, the original information may be recovered when a storage unit fails. One such storage unit configuration is referred to as RAID (Redundant Array of Inexpensive Disks). RAID systems typically store redundancy information in the form of data parity bytes.

FIG. 1 is a block diagram illustrating a typical prior-art computing system containing a central processing unit (CPU) 401, a buffer/controller 403, and a plurality of data storage units 404. The CPU 401 communicates with the buffer/controller 403 via a CPU bus 402, and the buffer/controller 403 communicates with the data storage units 404 via I/O buses 405. Also included in the system is a parity generation circuit 406. It is common for the speed of communications over the CPU bus 402 to be significantly faster than the speed of communications over the I/O buses 405. The I/O bus 405 speed is inherently limited by the data transfer times of the data storage units 404, whereas the CPU bus 402 speed is only limited by the gate delays of the electronic solid-state devices used in the CPU 401 and the buffer/controller 403, and the electrical properties of the physical bus conductors.

In a typical prior art computing system, the CPU bus 402 operates at about 40 megabytes per second, whereas each I/O bus 405 operates at about only 6 megabytes per second. However, in the case where a plurality of data storage units 404 are employed, it would be desirable to increase the effective speed of the I/O buses 405 by accessing a plurality of data storage units 404 in an interleaved manner.

A typical process for initially generating redundancy information, such as data parity bytes, from existing data includes receiving a first block of data from the CPU 401, writing the data block to a storage unit 404, and copying the data block to an electronic memory device. A second related block of data is then received from the CPU 401, and written to a corresponding location on a next storage unit 404. Concurrently, the first and second blocks of data are fed (byte-by-byte or word-by-word) to respective first and second inputs of an exclusive-OR (XOR) gate within the parity generation circuit 406, such that each byte from the first data block is XOR'd with a corresponding byte from the second data block. The output of the XOR gate represents parity information. The parity information calculated from the first and second data blocks is placed into the electronic memory device. The process is repeated until all related data blocks from the CPU 401 have been XOR'd with the contents of the electronic memory device, producing a final parity block which may be written to a data storage unit.

After a parity block is initially generated for a series of related data blocks, the parity block is updated each time one of the related data blocks on a storage unit is changed. This process is known as a "Read-Modify-Write" operation. The Read-Modify-Write operation uses a well-known algorithm that reads an old parity block and an old data block, then XOR's the old parity block, the old data block, and a new data block within the parity generation circuit 406 to generate a new parity block. The new data block and the new parity block are then written over the corresponding old data block and old parity block on the respective storage units 404.

FIG. 2 is a block diagram illustrating in greater detail a prior art parity generation circuit 406 for generating parity information. In the example shown, data storage units 600–603 are employed in conjunction with a word-wide, first-in/first-out (FIFO) memory 604, a two-input, 36-bit wide XOR gate 605, a counter 606, a switch 607, a tri-state buffer 608, a buffered data controller 610, storage unit buses 630, 632, 634, and 636, and a system bus 640. (The width of the "word" in the preferred embodiment is 36-bits, comprising 32 bits of data and 4 bits of hardware bus parity information for each byte; these 4 bits are not part of the redundancy information stored on the data storage units 600–603). The system bus 640 is connected to buffer/control circuitry 609. The buffer/control circuitry 609 interfaces the system bus 640 with a high-speed (e.g., 40 MHz) CPU bus 641. The data storage units 600–603 are organized into a plurality of blocks, such as a1, a2, a3, and a4, comprising a first data "stripe", and b1, b2, b3 and b4, comprising a second data "stripe".

The system of FIG. 2 commences a Read-Modify-Write operation of the data in block a1 by accessing the "old" data in block a1 of data storage unit 600. This old data traverses the storage unit bus 630 at a relatively low transfer rate. The buffered data controller 610, which comprises a plurality of device controllers having buffer memories, interfaces the storage unit bus 630 with the system bus 640. The switch 607 routes the old data from block a1 to the FIFO 604 over a first data line 620. The counter 606 counts the number of words written into the FIFO 604 (a separate counter, not shown, that is part of a DMA controller within the bus interface circuitry block 609, counts the number of times a complete data block is processed through the parity generation circuit 406). Once the FIFO 604 is filled with the old data from block a1, the counter 606 inputs a signal to the switch 607. The signal causes the switch 607 to route subsequent data over a second line 624 directly to a first input of the XOR gate 605.

If the data in block a2 is the "old" parity information for the a1–a4 data "stripe", then the old parity data from block a2 is read from storage unit 601 and transmitted to the switch 607, which routes the old parity/over data line 624 to the first input of the XOR gate 605. Simultaneous with the application of the parity block a2 to the first input of the XOR gate 605, the old data from the FIFO 604 is applied to the second input of the XOR gate 605, word-by-word, such that respective words from data block a1 are applied to the second input of the XOR gate 605 at the same time that corresponding words from parity block a2 are applied to the first input of the XOR gate 605. The output of the XOR gate 605 represents parity information for only data blocks a3 and a4 (i.e., the parity contribution of data block a1 has been subtracted out). The parity information thus generated is written back into the FIFO 604 over data line 626.

Thereafter, new data block a1', destined to be written over old block a1, is received on the CPU bus 641 from the CPU 401. The new data block is coupled to the system bus 640 by buffer/controller circuitry 609. As the new data block a1' is received, it is coupled via the buffered data controller 610 to the storage unit bus 630, and written over block a1. Concurrently, the new data block a1' is coupled via the switch 607 to the first input of the XOR gate 605, and XOR'd, word-by-word, with the partial parity information from the FIFO 604, thereby generating a new parity block a2' for the a1–a4 data stripe. The new parity block a2' is written back into the FIFO 604 over data line 626.

Once the external counter in the DMA controller within the bus interface circuitry block 609 indicates that the new parity block a2' has accumulated in the FIFO 604, that block is read under DMA control from the FIFO 604 and transmitted across data lines 622 and 628 to the tri-state buffer 608. Appropriate control signals are applied to the tri-state buffer 608, causing the buffer 608 to convey the new parity block a2' from the FIFO 604 to the system bus 640. The buffered data controller 610 receives the new parity block a2' and writes it to the corresponding data stripe of the allocated parity storage unit (here, block a2), thereby completing the Read-Modify-Write operation.

Although the above description uses 36-bit-wide (word-wide) portions of each block, the principles apply to any size width-unit of data, such as bit-wide or byte-wide.

The performance of present parity generation circuits of the type shown in FIG. 2 is limited by the maximum speed of the storage unit buses 630–636 relative to the CPU bus 641. Although the CPU bus 641 typically operates at about 40 MHz, the storage unit buses 630–636 operate at only about 6 MHz. Thus, the high-speed of the CPU bus 641 is not fully exploited. It would be very desirable to compensate for the disparity in the respective bus speeds so that the advantages of the higher speed CPU bus 641 could be fully realized.

What is needed is an improved technique for generating parity blocks which offers increased speed and efficiency in this manner, the advantages of currently-existing high-speed CPUs and electronic memories may be fully exploited. Furthermore, a flexible parity generation scheme is required, which is adaptable to a wide variety of system applications and uses.

The present invention provides such a solution.

SUMMARY OF THE INVENTION

The invention comprises a redundant array computer system having a high-speed CPU bus and lower-speed I/O buses, in which parity blocks are generated for a plurality of data blocks from multiple CPU bus logical channels in a randomly-interleaved manner to provide enhanced I/O transfer rates. For example, such a system may have two channels for processing two sets of data, to better match the transfer rate of the CPU bus to the lower-speed I/O buses. Consequently, parity information must be generated for the data blocks on each of the data channels. The inventive parity generation technique employs switching means to switch channels on the CPU bus between the first set and the second set, generating parity information that can be transferred independently over two I/O buses. In this manner, the parity generation technique achieves an effective I/O bus transfer rate more closely matched to the speed of the CPU bus. Further, the invention shares a single word-wide XOR circuit (comprising a set of XOR gates) and related support circuitry between multiple logical channels by providing a configurable electronic memory, thus achieving economies in implementation.

In a two-way interleaved embodiment of the present invention, the parity generation circuit operates by placing a first data block representing a portion of a first data set into a first portion of a configurable electronic memory. The words comprising the first data block are read from the electronic memory and coupled to a first input of an exclusive-OR (XOR) gate. A second, related data block from the first data set is coupled, word-by-word, to a second input of the XOR gate, where respective words of the first data block read from the electronic memory are XOR'd with corresponding words of incoming data from the second data block. The XOR'd data are placed back into the first portion of the electronic memory. Interleaved with the aforementioned operations (but not necessarily in a lock-step, dedicated time-slot fashion), a third data block representing a portion of a second data set is placed into a second portion of the configurable electronic memory. This data block is read, word-by-word, from the electronic memory and coupled to the first input of the XOR gate, but only in a time period during which no other signals are present at the first input. A fourth, related data block representing a portion of the second data set is coupled, word-by-word, to the second input of the XOR gate, where respective words of the third data block from the electronic memory are XOR'd with corresponding words of incoming data from the fourth data block. The XOR sum is placed back into the second portion of the electronic memory.

Thus, the invention operates in somewhat the same fashion as the prior art, except that the XOR'ing of first and second data blocks of the first data set are randomly interleaved with the XOR'ing of third and fourth data blocks from the second data set. Further, only one configurable electronic memory, XOR circuit, and set of data-routing circuitry is required to generate parity for a plurality of data channels. Accordingly, the principles of the configurable electronic memory can be extended to generating parity information for a plurality of data sets in an interleaved fashion.

The preferred embodiment of the invention uses a random-access memory (RAM), operated as a first-in/first-out (FIFO) register, as a configurable electronic memory. The RAM may be partitioned into a plurality of memory areas to implement randomly interleaved parity generation operations for a plurality of data sets.

As the RAM is divided into smaller and smaller partitions, the capability of the parity generator to match the CPU bus speed to the I/O bus speed will improve (to a point). However, for certain system applications, it may be desirable to eliminate the RAM memory partitions altogether, and to utilize the RAM as a large, unified FIFO. In this manner, the system can be adapted to generate parity information for very large blocks of data in a single channel.

These and other advantages and objects of the invention will be better understood by reference to the accompanying drawings and the detailed description below

BRIEF DESCRIPTION OF THE DRAWINGS

Like reference numbers and designations in the various drawings refer to like elements.

DETAILED DESCRIPTION OF THE PREFERRED EMBODIMENTS

Throughout this description, the preferred embodiment and examples shown should be considered as exemplars, rather than limitations on the structure and method of the present invention.

Figure 1:
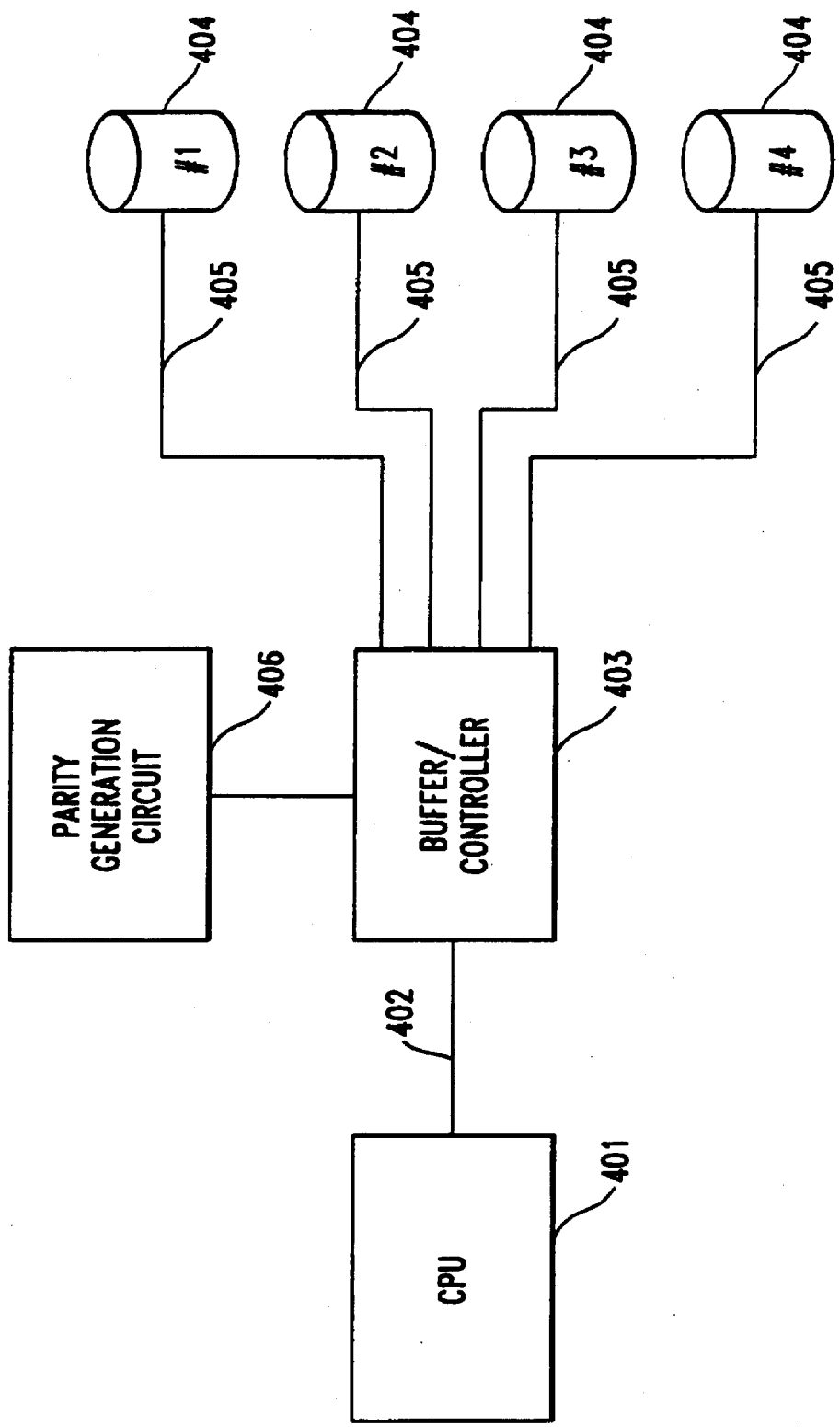
FIG. 1 is a block diagram illustrating a typical prior art computing system having redundant array storage.
Figure 2:
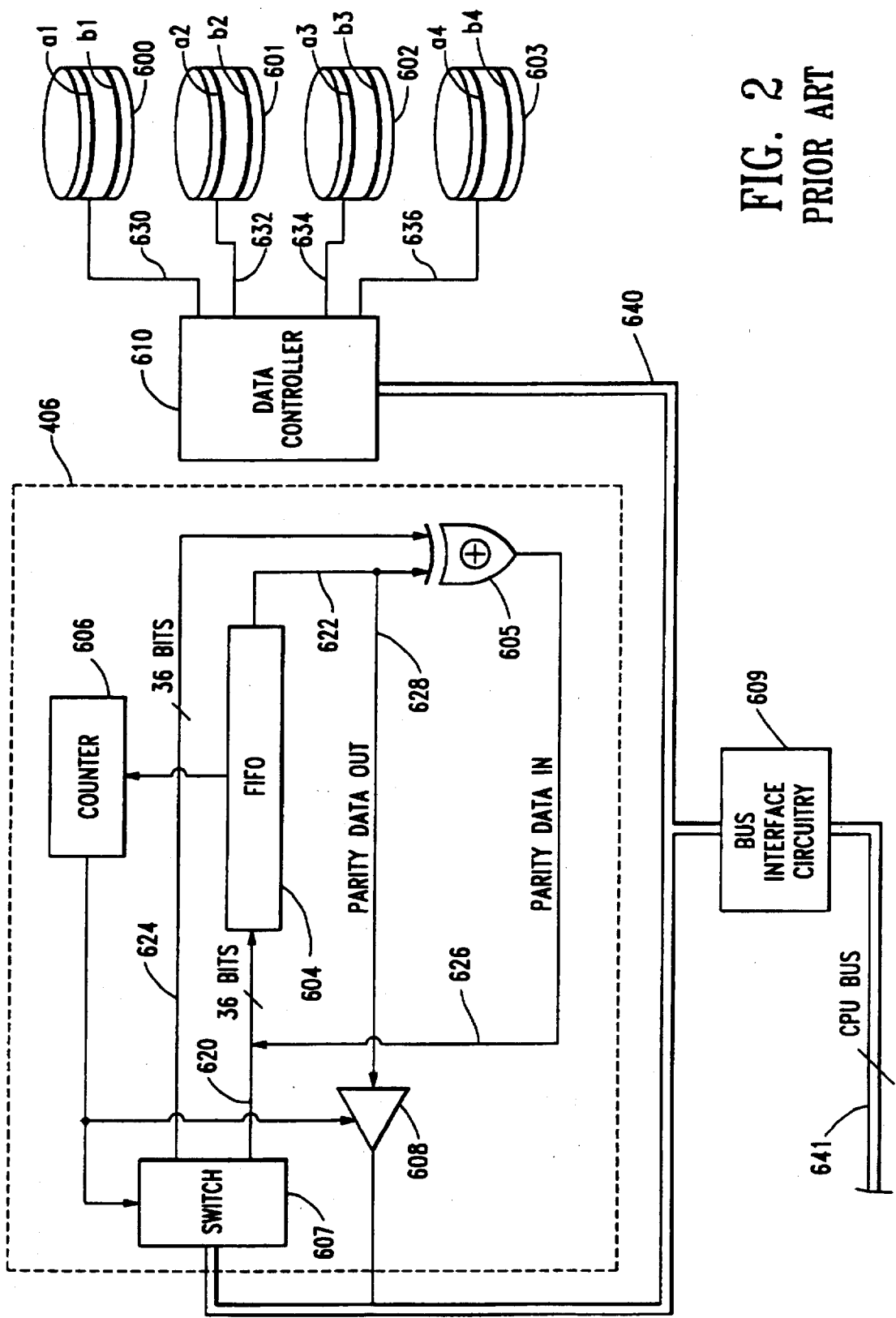
FIG. 2 is a block diagram illustrating a prior art circuit for generating parity information.
Figure 3:
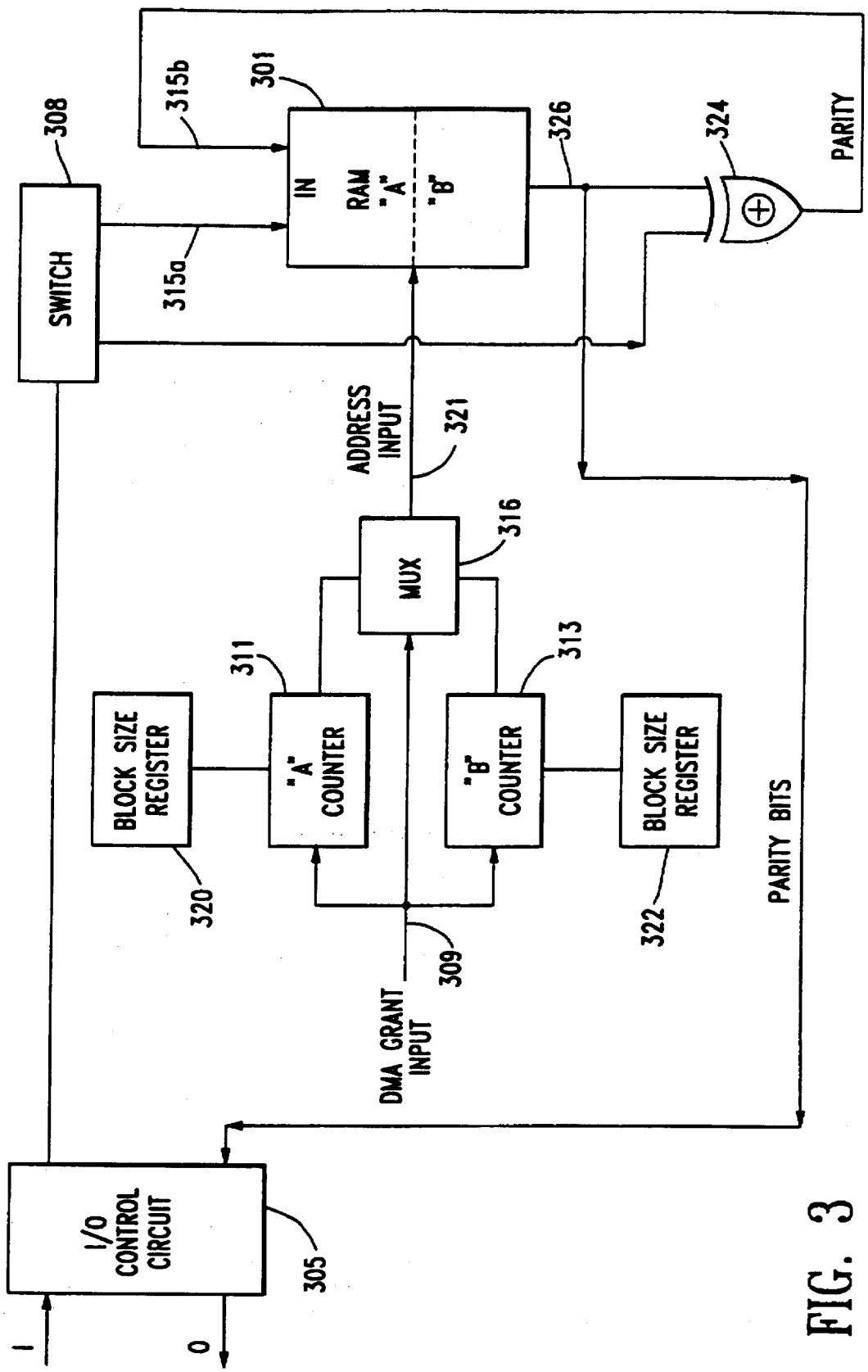
FIG. 3 is a block diagram illustrating a dual-channel embodiment of the invention.

FIG. 3 shows a preferred embodiment of a two-channel flexible parity generation circuit in accordance with the present invention, The function of the parity generation circuit shown in FIG. 3 is analogous to the function of block 406 in FIGS. 1 and 2.

The circuit of FIG. 3 includes a random access memory (RAM) 301 which is coupled by means of an address input line 321 to a multiplexer (MUX) 316. The inputs to the MUX 316 are an "A" counter 311 and a "B" counter 313, each corresponding to a parity generation channel, "A" and "B". Each of the counters 311, 313 are enabled by a DMA grant input 309, appropriately coded such that only one of the two counters can be actively incremented or decremented at a time (i.e., two simultaneous DMA grants are not allowed). The DMA grant input 309 is also coupled to the MUX 316 to act as a selector signal for the outputs of counter A 311 and counter B 313.

The "load" inputs of counter A 311 and counter B 313 are respectively coupled to block size registers 320, 322. Each block size register 320, 322 is programmed to store the size of the data block to be processed through a respective logical channel of the parity generation circuit. Thus, for example, if a data block is 1024 words long, that value will be stored in the associated block size register, In an alternative embodiment, the counters 311, 313 can have a fixed count size, and thus the block size registers 320, 322 would not be necessary.

In the preferred embodiment, each of the counters 311, 313 are 11-bit wide, loadable, binary count-down counters. Upon initialization, the size of the block to be used in a particular channel is loaded into the associated block size register 320, 322. The corresponding counter 311, 313 is initialized to the block size stored in the associated block size register 320, 322. The counters are then decremented, as described below, until they reach a terminal count of "0". At that point, the counter is re-loaded with the block size from its associated block size register.

Counter A 311 and counter B 313 are enabled by the DMA gram input 309 such that the counters 311, 313 provide address inputs to the RAM 301 in an interleaved manner, and not simultaneously. The DMA grant input 309 is generated in known fashion by the bus interface circuitry 609 (FIG. 2). The address outputs of the counters 311, 313 are mapped onto the RAM 301 addresses to create non-overlapping partitions in the RAM 301. For example, the lower 10 bits output by counter A 311 are mapped into the lower 1024 words of the RAM 301 by setting the 11th high order bit of the counter to "0". The lower 10 bits of counter B 313 are mapped into the upper 1024 words of the RAM 301 by setting the 11th high order bit to "1". Setting the high order bit for both counter A 311 and counter B 313 can be accommodated by setting an appropriate value in the corresponding block size register 320, 322.

It will be recognized that the configuration of the counters 311, 313, block size registers 320, 222, and RAM 301 shown in FIG. 3 permits each of the partitions of the RAM 301 to behave like a first-in/first-out (FIFO) register.

Prior to calculation of parity data for a selected channel, a partition of the RAM 301 must be loaded with an initial data block. This function is accomplished by placing the RAM 301 into a write mode. An initial data block from a selected channel (e.g., channel A) is transferred from the system bus 640 (FIG. 2) through an I/O control circuit 305 and a switch 308 to a data input line 315a coupled to the RAM 301. The initial data block from the selected channel is written into the RAM 301 beginning at the address initially specified by the correspondingly enabled counter 311, 313. As each data word from the data block is accepted through the I/O control circuit 305 and written into the corresponding partition of the RAM 301, the corresponding counter 311, 313 associated with a selected channel is decremented sequentially. This process continues until the corresponding partition of the RAM 301 is fully loaded with the initial data block. Once an initial data block has been written to the RAM 301, the counter 311, 313 corresponding to the active channel is re-initialized to the value set in its corresponding block size register 320, 322. Subsequently, the switch 308 (which may be controlled by the first re-initialization state of a counter and/or by the DMA grant signal 309) routes incoming data blocks from the I/O control circuit 305 to a first input of an exclusive OR (XOR) gate 324, the other input of which is the data output line 326 from the RAM 301. Thereafter, data blocks for the active channel that correspond to the initial data block loaded into the corresponding partition of the RAM 301 are coupled through the I/O circuit 305 and the switch 308 to the XOR gate 324, to be XOR summed with the corresponding contents of the RAM 301. The output of the XOR gate 324 is coupled back to the input of the RAM 301 through a data input line 315b. Each counter 311, 313 causes each data word in the corresponding partition of the RAM 301 to be coupled to the XOR gate 324 while permitting the XOR sum from XOR gate 324 to be written into the RAM 301 in the same address positions just read.

After each data block is XOR summed with the contents of the corresponding partition in the RAM 301, the corresponding counter 311, 313 is re-set, to permit another block to be XOR summed in a like manner.

If the DMA grant input 309 changes value at any time, the active counter stops counting, and the other counter may begin to operate. Thus, both counters 311, 313 can operate concurrently, but not simultaneously. It should be noted that there is no fixed time relationship between how long one counter can operate in comparison to how long the other counter can operate. Since it is common for data to be received from the CPU in small bursts for each channel, the present invention permits the parity generation circuitry to be "time-shared" between a plurality of data channels, with concurrent (but not exactly simultaneous) generation of parity for each channel.

After all XOR sums for a set of data blocks have been performed, the contents of one of the selected partitions of the RAM 301 are again addressed by the corresponding counter 311, 313, and read out of the RAM 301 through an output port of the I/O control circuit 305 under DMA control. (In an alternative configuration, for the last XOR pass, the final parity block can be directly transmitted from the XOR gate 324 to the output port of the I/O control circuit 305 without prior storage in the RAM 301). In this manner, the inventive parity generation circuit can calculate parity information for a plurality of data channels.

In the present example, the use of the two counters 311, 313 permits the concurrent calculation of parity information for two independent sets of data blocks. However, it should be understood that more than two counters could be used, and the RAM 301 could be partitioned accordingly, to permit multiplexed parity information generation for more than two sets of data blocks. Also, while the preferred embodiment uses decrementing counters 311, 313, it would be within the skill of one of ordinary skill in the art to configure the inventive circuit to use incrementing counters.

The system of FIG. 3 may be adapted to a variety of system requirements. By processing multiple channels of data over the system bus 640, and dividing the RAM 301 into partitions, parity blocks for a plurality of data channels, and hence data storage units 404, can be generated concurrently. The resulting parity blocks can be transmitted concurrently to the storage units 404 through the buffered data switch 610, to be written to a respective storage unit 600–603 (see FIG. 2). Each data channel has an effective data transfer rate, taking into account channel switching times and other processing overhead. The use of the "time-shared" parity generation circuit of the present invention permits generating parity information for a plurality of data channels. Conceptually, the total system bus 640 bandwidth can be divided into data channels each having an effective data transfer rate equal to the data transfer rate of the individual I/O buses 630–636, Such matched rates better utilize all of the system resources, improving the overall efficiency of the system.

In an alternative configuration, the partitions of the RAM 301 may be eliminated altogether, and a single counter used in order to accommodate parity generation for large blocks of data. For example, in normal use, the RAM 301 may comprise 2048 words of address space, and be divided into two partitions of 1024 words each, to accommodate data blocks of the same size. In such a case, both counters 311, 313 would be used for processing two data channels. Alternatively, all 2048 words of addressable space in the RAM 301 could be used to accommodate a single channel of data blocks up to 2048 words in size. Because the block size registers 320, 322 are programmable, the parity generation circuit of the present invention can be flexibly and dynamically adapted to varying block sizes.

Figure 4:
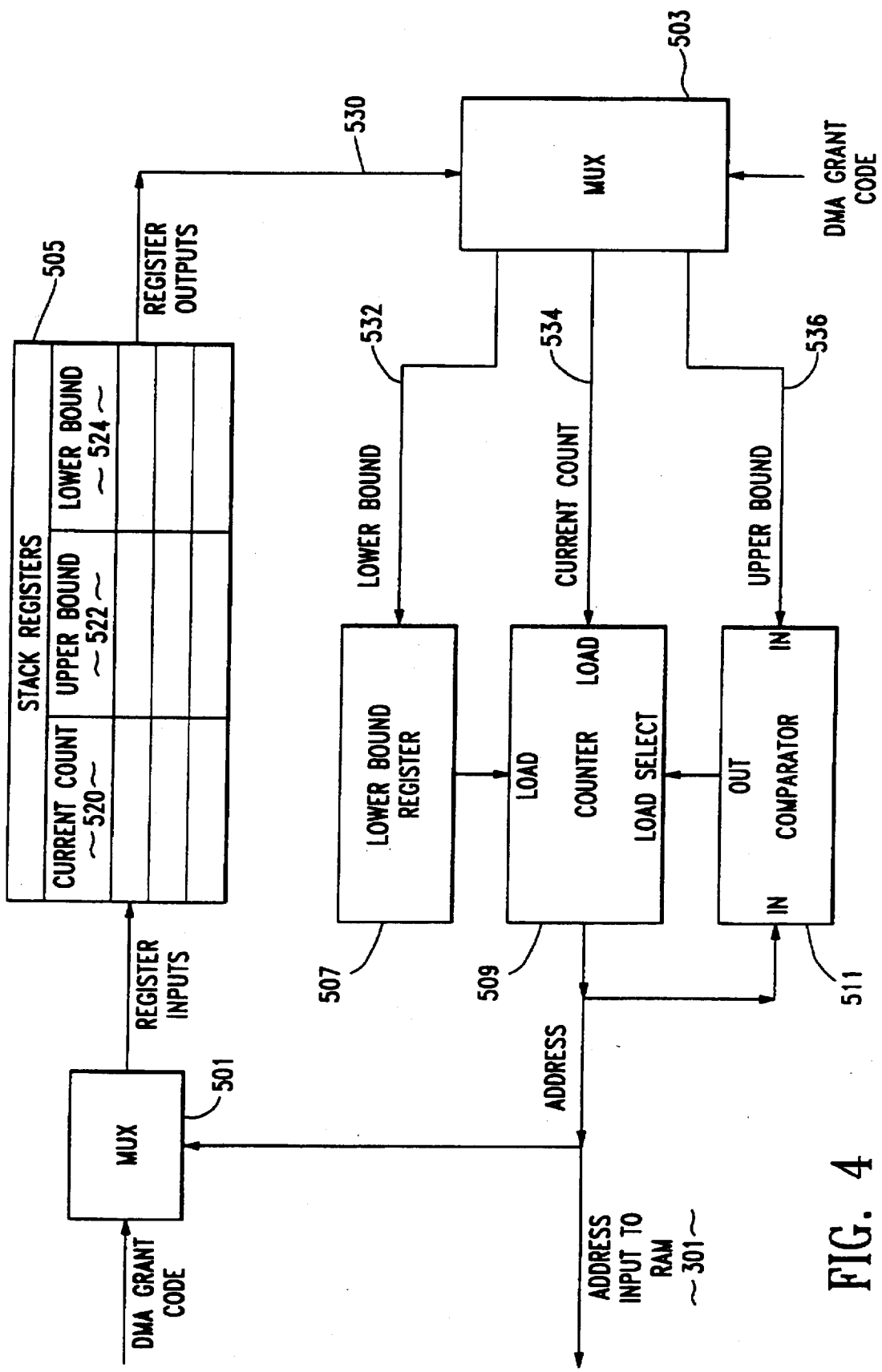
FIG. 4 is a block diagram illustrating a multiple-channel embodiment of the invention shown in FIG. 3.

In an alternative embodiment of the invention, the system of FIG. 3 may be modified by replacing the counters 311, 313, block size registers 320, 322 and MUX 316 with a multi-register, single-counter circuit, as shown in FIG. 4. A set of stack registers 505 is used to store a list of addresses defining partitions in the RAM 301 corresponding to a plurality of data storage units. Each register of the set of stack registers 505 contains three values for a corresponding data channel: a current count value 520, which is the current address value for the RAM 301 partition corresponding to the stack register; an upper bound 522, which defines the upper boundary address of the partition in the RAM 301 corresponding to the stack register; and a lower bound 524, which defines the lower boundary address of the partition in the RAM 301 corresponding to the stack register. In other words, the lower bound 524 and upper bound 522 define the address limits for a particular partition in the RAM 301, while the current count value 520 indicates a specific data location between the upper and lower boundaries of a particular partition.

The upper and lower bounds can be dynamically set to accommodate partitions of varying size. It should be noted that the partitions need not be of equal size. Thus, the invention can accommodate data blocks of, for example, 1024 words for one redundancy group of storage units, and a block size of 4096 words for another redundancy group of storage units.

In normal use, the stack register 505 receives an input from a first MUX 501, and transmits an output to a second MUX 503. A DMA grant code, having enough bits to distinguish each of the stack registers, acts as a selector value for both the input MUX 501 and the output MUX 503. The output MUX 503 couples the three stack register values 520, 522, 524 for a particular stack register to three data lines 532, 534, 536, representing a lower bound value, a current count value, and an upper bound value, respectively. The lower bound data line 532 inputs a lower bound value into a lower bound register 507, the output of which is coupled to a first "load" input of the counter 509. The current count value data line 534 loads the current count value into a second "load" input of the counter 509. The upper bound data line 536 is coupled to one input of a comparator 511, the other input to which is the address output of the counter 509. The output of the counter 509 is further coupled to the address inputs of the RAM 301, and also to the input MUX 501.

In operation, the DMA grant code selects a particular stack register 505 corresponding to an active channel. The current count, upper bound, and lower bound are coupled to the counter 509, the comparator 511, and the lower bound register 507, as described above. The counter 509 counts data words for a partition in the RAM 301, in accordance with the discussion set forth above with respect to FIG. 3.

The counter 509 continues to count up from its lower bound to its upper bound. Upon reaching its upper bound for a particular channel, as determined by the comparator 511, the counter 509 is re-loaded with the contents of the lower bound register 507. Consequently, the counter 509 cyclically counts through all of the addresses of a particular partition in the RAM 301.

If the DMA grant code for a current stack register is changed, the current address being output by the counter 509 is loaded through the input MUX 501 into the corresponding stack register 505 as a new current count value 520. In this way, the parity generation operation for a particular channel can be interrupted and resumed at a later time without loss of information. Parity generation for other channels may be performed concurrently, by fetching the current count, upper bound, and lower bound values from another stack register and applying them to the counter 509, the comparator 511, and the lower bound register 507, as described above. As will be apparent from examining FIG. 4, any number of partitions in the RAM 301 can be accommodated by having a stack register 505 for each desired partition.

The inventive parity generation circuit may be implemented on an application-specific integrated circuit (ASIC). The electronic memory may be a RAM and/or a FIFO memory device, depending upon the specific system application. Furthermore, the internal control logic necessary to arbitrate and perform high-speed, single or multiple parity channel direct memory accesses in a databus environment may be implemented within an ASIC.

The above description sets forth the best mode of the invention which is presently contemplated. However, upon reviewing the description, various changes and modifications will become obvious to one skilled in the art. For example, the inventive circuit may be adapted to generate redundancy information other than simple XOR parity. An alternative technique using Reed-Solomon codes is disclosed in U.S. patent application Ser. No. 270,713, filed Nov. 14, 1988, entitled "Arrayed Disk Drive System and Method" and assigned to the assignee of the present invention. Accordingly, the term "parity" as used with respect to the invention means any redundancy information.

As another example, the configurable memory device need not be a RAM circuit. Other types of configurable memories could be employed to meet various specific system applications. For example, in another embodiment of the invention, a plurality of actual first-in/first-out (FIFO) memory devices and a multiplexer circuit are used as a fixed-size electronic memory. The multiplexer routes the signals at the inputs and outputs of the FIFO memory devices so that each FIFO, corresponding to a "partition", processes parity information for a separate data set. The FIFO's implement these operations in a randomly-interleaved manner. If two FIFO's are employed, the first FIFO processes parity information for a first logical channel, and the second FIFO processes parity information for a second logical channel. In addition, other memory technologies could be employed in place of the RAM 301. Accordingly, the broad scope of the invention is to be determined not only in view of the foregoing description, but also in conjunction with the appended claims.

We claim:

1. A method for generating redundancy blocks associated with a multiplicity of data blocks for each of a plurality of data channels in conjunction with a data block modification operation, said method comprising the steps of:

logically partitioning a memory device into a like plurality of data storage locations corresponding to said plurality of data channels;

storing a first data block and associated first at least one redundancy block from a first of said plurality of data channels in a first of said data storage locations;

interleaving and storing a second data block and associated second at least one redundancy block from a second of said plurality of data channels in a second of said data storage locations timewise during the storing of said first data block and said associated first at least one redundancy block;

modifying said first data block to a modified first data block;

inputting said modified first data block to said first of said data storage locations;

and computing an associated modified first at least one redundancy block based upon said first data block, said associated first at least one redundancy block, and said modified first data block.

2. The method of claim 1 further comprising the step of: replacing in a first of said data storage locations said first data block with said modified first data block; and further replacing in a first of said data storage locations said associated first at least one redundancy block with said associated modified first at least one redundancy block.

3. The method of claim 1 further comprising the steps of:

also modifying said second data block to a modified second data block;

also inputting said modified second data block to said second of said data storage locations; and also computing an associated modified second at least one redundancy block based upon said second data block, said associated second at least one redundancy block and said modified second data block.

4. The method of claim 1 wherein said step of storing is carried out by the step of:

writing said first data block and associated first at least one redundancy block into a portion of said first of said data storage locations.

5. The method of claim 1 wherein said step of computing is carried out by the step of:

XORing said first data block, said associated first at least one redundancy block and said modified first data block to provide said associated modified first at least one redundancy block.

6. The method of claim 1 wherein said step of logically partitioning is carried out by a like plurality of first-in/first-out registers.

7. The method of claim 6 wherein said step of logically partitioning is further carried out by the step of:

selectively enabling an individual one of said plurality of first-in/first out registers corresponding to a selected one of said plurality of data channels.

8. The method of claim 1 wherein said step of logically partitioning is carried out by at least one randomly accessible memory array.

9. The method of claim 8 wherein said step of logically partitioning is further carried out by the step of:

addressing a selected one of said plurality of data storage locations of said randomly accessible memory array corresponding to a selected one of said plurality of data channels.

10. The method of claim 9 wherein said step of addressing is carried out by the step of:

coupling a counter to each of said plurality of data channels to provide a pointer to a portion of each of said data storage locations for said step of storing.

11. The method of claim 10 wherein said step of coupling is carried out by the step of:

programming each of said counters to a block size of said data blocks on each of said plurality of data channels.

12. The method of claim 1 wherein said step of interleaving and storing a second data block comprises randomly interleaving said second data block in said second of said data storage locations.

13. The method of claim 1 wherein said step of computing an associated modified first at least one redundancy block comprises performing at least one logical XOR operation on said first data block, said associated first at least one redundancy block, and said modified first data block.

14. The method of claim 13 wherein said step of computing an associated modified first at least one redundancy block comprises computing an associated modified first at least one parity block.

15. A multi-channel redundancy block generation circuit comprising:

an input data bus for receiving data blocks and associated redundancy blocks from a plurality of logical data channels;

a memory device logically partitioned into a like plurality of data storage locations, each corresponding to one of said plurality of logical data channels;

a switching circuit operatively coupled to said data input bus for selectively applying said data blocks and associated redundancy blocks from said plurality of logical data channels in a timewise interleaved manner to at least one data input of said memory device;

an address selector circuit operatively coupled to an address input of said memory device for directing said data blocks and associated redundancy blocks from said plurality of logical data channels to a desired location in a corresponding one of said plurality of data storage locations in said memory device;

a multi-input redundancy block generator coupled to at least one output of said memory device for generating at least one redundancy block in response to data maintained in a portion of a particular one of said plurality of data storage locations; and an output data bus coupled to receive an output of said multi-input redundancy block generator for transferring said at least one redundancy block to a corresponding one of said plurality of logical data channels.

16. The multi-channel redundancy block generation circuit of claim 15 wherein said memory device comprises a plurality of first-in/first-out registers.

17. The multi-channel redundancy block generation circuit of claim 15 wherein said memory device comprises a randomly accessible memory device having a plurality of non-overlapping data storage locations.

18. The multi-channel redundancy block generation circuit of claim 15 wherein said switching circuit further selectively applies said data blocks and associated redundancy data blocks for a selected one of said plurality of logical data channels to said at least one input of said memory device.

19. The multi-channel redundancy block generation circuit of claim 18 wherein outputs from a particular one of said plurality of data storage locations in said memory device corresponding to said selected one of said plurality of logical data channels are output to said multi-input redundancy block generator.

20. The multi-channel redundancy block generation circuit of claim 15 further comprising:

an addressing circuit coupled to an address input of said memory device for directing said data blocks and associated redundancy blocks for each of said plurality of logical data channels to a corresponding one of said like plurality of data storage locations.

21. The multi-channel redundancy block generation circuit of claim 20 wherein said addressing circuit further comprises:

a counter associated with each of said plurality of logical data channels for providing a count to said addressing circuit indicating a pointer to a portion of one of said data storage locations corresponding to a selected one of said logical data channels.

22. The multi-channel redundancy block generation circuit of claim 21 wherein said counter is programmable with a block size of said data blocks on each of said plurality of logical data channels.

23. The multi-channel redundancy block generation circuit of claim 15 wherein said multi-input redundancy block generator is a two input redundancy block generator.

24. A multi-channel redundancy block generation circuit, comprising:

an input data bus for receiving data blocks and associated redundancy blocks from a plurality of logical data channels;

a memory device logically partitioned into a like plurality of data storage locations, each corresponding to one of said plurality of logical data channels;

a switching circuit operatively coupled to said data input bus for selectively applying said data blocks and associated redundancy blocks from said plurality of logical data channels in a timewise, interleaved manner to at least one data input of said memory device;

an address selector circuit operatively coupled to an address input of said memory device for directing said data blocks and associated redundancy blocks from said plurality of logical data channels to a desired location in a corresponding one of said plurality of data storage locations in said memory device;

a multi-input redundancy block generator coupled to at least one output of said memory device for generating at least one redundancy block in response to data maintained in a portion of a particular one of said plurality of data storage locations; and an output data bus coupled to receive an output of said multi-input redundancy block generator for transferring said at least one redundancy block to a corresponding one of said plurality of logical data channels.

* * * * *